US012583141B2

(12) United States Patent
Chen

(10) Patent No.: US 12,583,141 B2
(45) Date of Patent: Mar. 24, 2026

(54) PIPE CUTTING DEVICE

(71) Applicant: Shih-Yang Chen, Changhua County (TW)

(72) Inventor: Shih-Yang Chen, Changhua County (TW)

( * ) Notice: Subject to any disclaimer, the term of this patent is extended or adjusted under 35 U.S.C. 154(b) by 103 days.

(21) Appl. No.: 18/812,873

(22) Filed: Aug. 22, 2024

(65) Prior Publication Data

US 2026/0054406 A1 Feb. 26, 2026

(51) Int. Cl.
*B26D 3/16* (2006.01)

(52) U.S. Cl.
CPC .................................... *B26D 3/169* (2013.01)

(58) Field of Classification Search
CPC .................................. B26D 3/16; B26D 3/169
See application file for complete search history.

(56) References Cited

U.S. PATENT DOCUMENTS 3,171,199 A * 3/1965 Meese .................... B23D 21/10 30/94
3,376,638 A * 4/1968 Bjalme .................. B23D 21/08 411/433
5,943,778 A * 8/1999 Alana .................... B23D 21/00 30/101
6,539,634 B2 4/2003 Merle et al.
8,573,099 B2 * 11/2013 Huang ................... B23D 21/08 82/113
10,052,701 B2 * 8/2018 Zhou .................... B26D 7/2621
11,224,925 B2 * 1/2022 Canis ..................... B23D 21/06
11,285,551 B2 * 3/2022 Lee ...................... B26D 7/2635
11,571,755 B2 * 2/2023 Heinsohn ............... B23D 21/06
12,472,654 B2 * 11/2025 Huang ................... B23D 21/08
2007/0180701 A1 * 8/2007 Hutt ....................... B26D 3/169 30/95

* cited by examiner

*Primary Examiner* — Boyer D Ashley
*Assistant Examiner* — Richard D Crosby, Jr.
(74) *Attorney, Agent, or Firm* — LANWAY IPR SERVICES; Chun-Ming Shih

(57) ABSTRACT

A pipe cutting device includes a body unit, two roller units, a sliding unit, a threaded rod unit, and a control unit. The body unit includes two bodies each provided with a first receiving recess, a first pivoting section, and a second receiving recess. The sliding unit includes a slide and a cutting wheel. The slide is provided with a fourth receiving recess, a first pivot portion, a fifth receiving recess, and a sixth receiving recess. The threaded rod unit includes a rotation member and a threaded rod. The threaded rod is provided with a second pivoting section and a first screwing portion. The control unit includes a press member, a control member, and an elastic member. The control member is assembled with the press member and provided with a second screwing portion engaging the first screwing portion.

11 Claims, 13 Drawing Sheets

PIPE CUTTING DEVICE

BACKGROUND OF THE INVENTION

Field of the Invention

The present invention relates to a cutting device and, more particularly, to a pipe cutting device.

Description of the Related Art

A conventional paring device was disclosed in the U.S. Pat. No. 6,539,634, and comprises a paring head 2 and a snap lock 8. The snap lock 8 has a seesaw structure. After the snap lock 8 is pressed, the screwing portion disengages the threaded rod, so that the paring head 2 is pushed to move rapidly.

A conventional pipe cutting device was disclosed in the U.S. Pat. No. 11,571,755, and comprises an engagement element 21, a work head 3, a counter-support 4, and a positioning element 5. The engagement element 21 has a seesaw structure. After the engagement element 21 is pressed, the screwing portion disengages the threaded rod, so that the positioning element 5 is pushed to move rapidly.

However, the conventional pipe cutting device has the following disadvantages.

1. With reference to FIG. 6, the cutting element 10 and the spindle part 15 are not located at the same axis. After the cutting element 10 is subjected to a force, the force is transmitted to the engagement element 21. The engagement element 21 engages the spindle part 15 so that the teeth of the engagement element 21 withstand a larger torque. Thus, the cutting element 10 and the spindle part 15 are arranged in a staggered manner and occupy a larger structural space. In addition, the cutting element 10 and the spindle part 15 are not supported steadily when the cutting element 10 is subjected to a force.

2. After the toothed section 26 of the engagement element 21 is unlocked from the receiving part 19, the cutting element 10 and the engagement element 21 slide in the carriage guide 9. The engagement between the toothed section 26 of the engagement element 21 is unlocked from the receiving part 19 is controlled by a seesaw or lever principle of the engagement element 21. Thus, the position of the shaft of the engagement element 21 is very important. The engagement element 21 cannot engage the receiving part 19 exactly if the position of the shaft has an error or allowance.

BRIEF SUMMARY OF THE INVENTION

The primary objective of the present invention is to provide a pipe cutting device whose parts are assembled exactly and steadily.

In accordance with the present invention, there is provided a pipe cutting device comprising a body unit, two roller units, a sliding unit, a threaded rod unit, and a control unit. The body unit includes two bodies. Each of the two bodies is provided with a first receiving recess, a first pivoting section, two abutting edges, and a second receiving recess. The two roller units are pivotally mounted in the second receiving recess. The sliding unit includes a slide and a cutting wheel. The slide is provided with a fourth receiving recess, a first pivot portion, a first axis, a fifth receiving recess, a second axis, a sixth receiving recess, and a protruding block. The cutting wheel is provided with a knife portion. The threaded rod unit includes a rotation member and a threaded rod. The rotation member is provided with a first mounting portion. The threaded rod is provided with a second pivoting section and a first screwing portion. The control unit includes a press member, a control member, and an elastic member. The control member is assembled with the press member. The control member is provided with a second screwing portion engaging the first screwing portion.

According to the primary advantages of the present invention, the sliding unit is moved in the first receiving recess, the threaded rod unit is pivotally connected with the body unit and the sliding unit, and the control unit is received in the sliding unit, so that the body unit, the sliding unit, the threaded rod unit, and the control unit are assembled exactly.

According to another advantage of the present invention, the control unit is moved linearly so that the second screwing portion engages or disengages the first screwing portion. The position of the sixth receiving recess may have a larger tolerance. After the control unit is received in the sixth receiving recess, the user only needs to rotate the threaded rod unit slightly to engage the second screwing portion with the first screwing portion. Thus, the second screwing portion engages the first screwing portion exactly by a linear displacement of the control unit.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
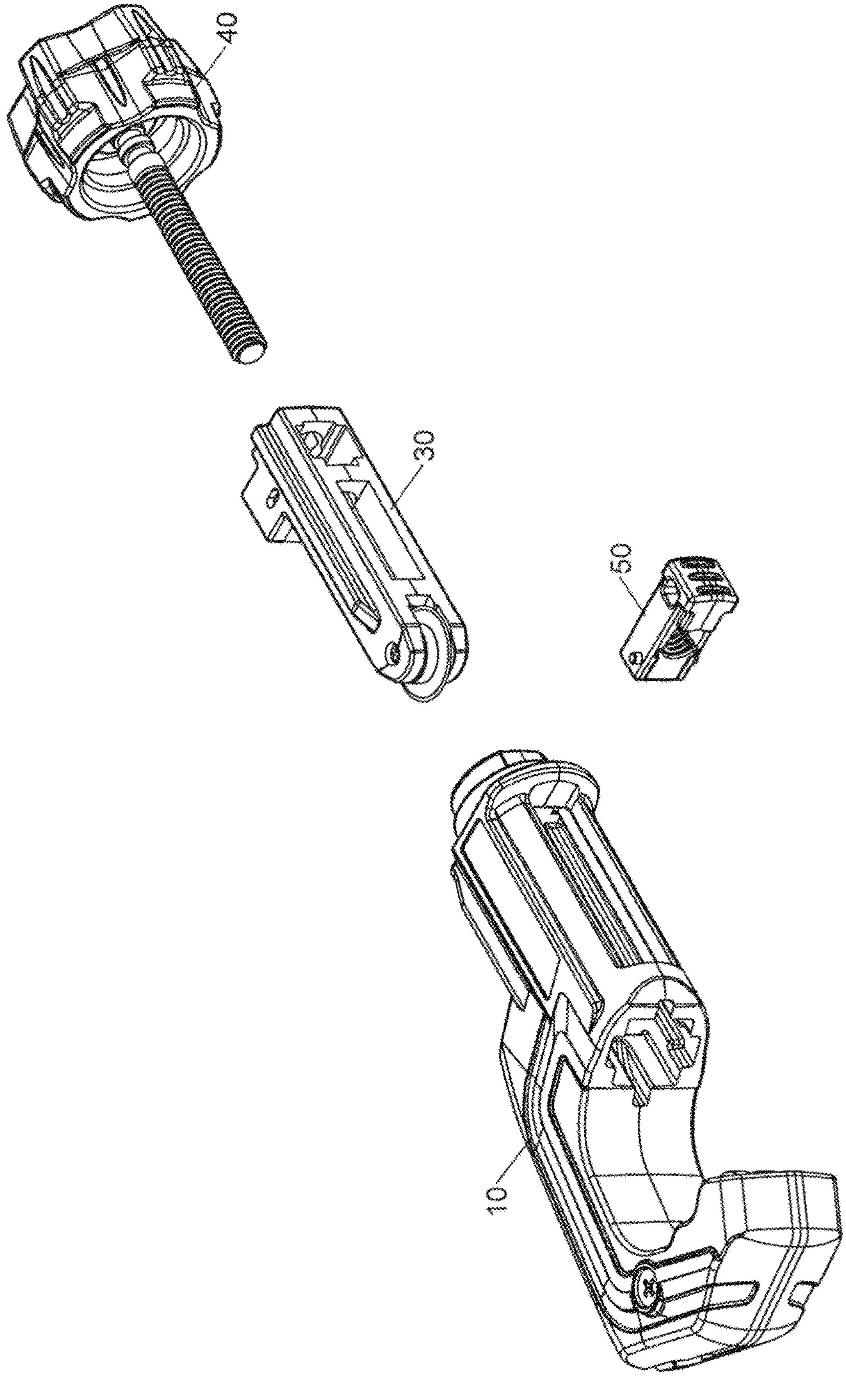
FIG. 1 is an exploded perspective view of a pipe cutting device in accordance with the preferred embodiment of the present invention.
Figure 2:
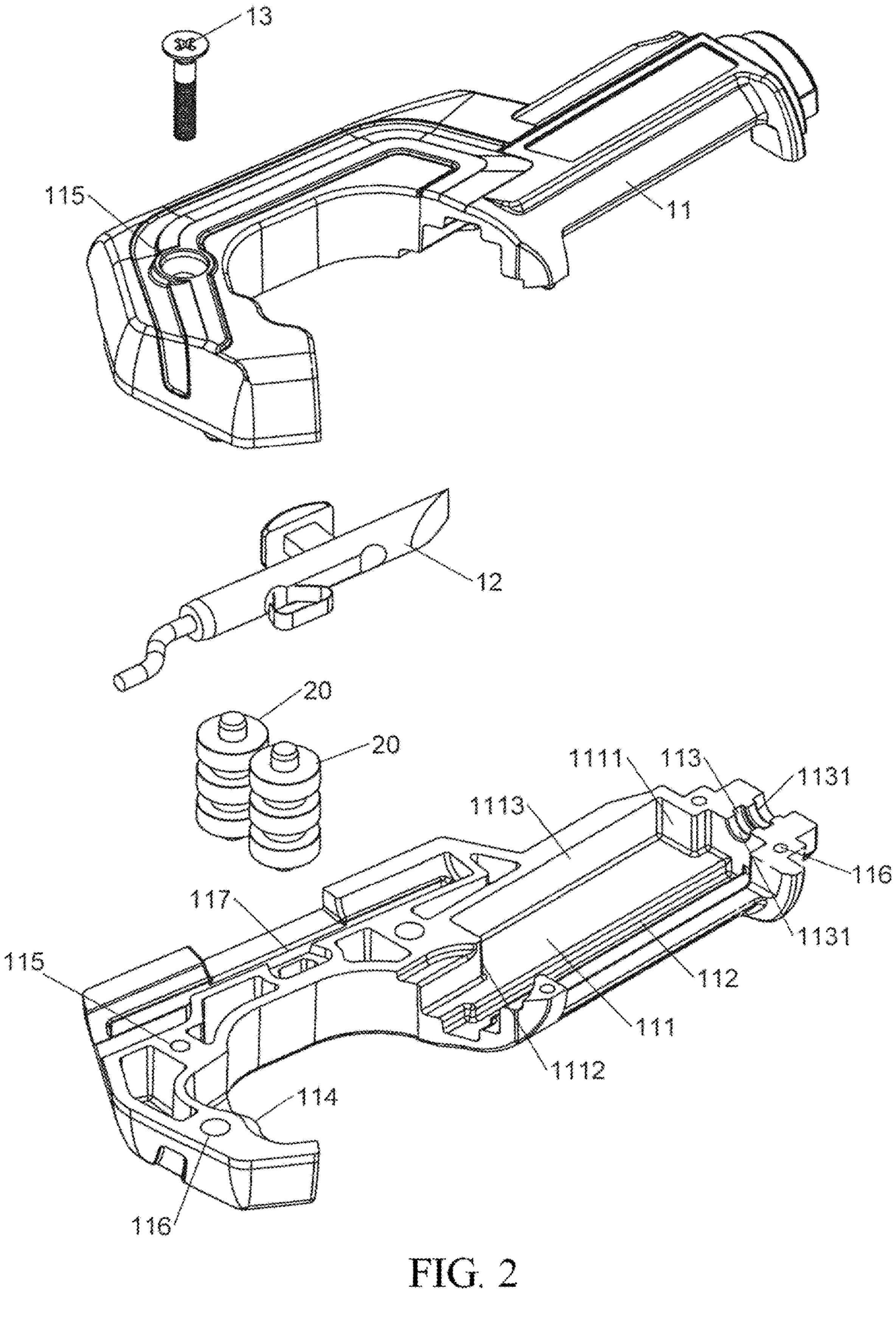
FIG. 2 is a partial exploded perspective view of the pipe cutting device in accordance with the preferred embodiment of the present invention.
Figure 3:
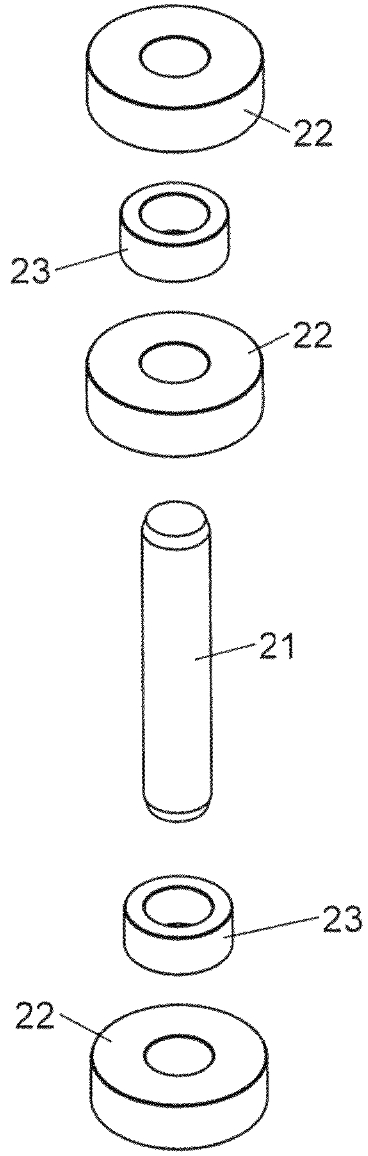
FIG. 3 is an exploded perspective view of a roller unit of the pipe cutting device in accordance with the preferred embodiment of the present invention.
Figure 4:
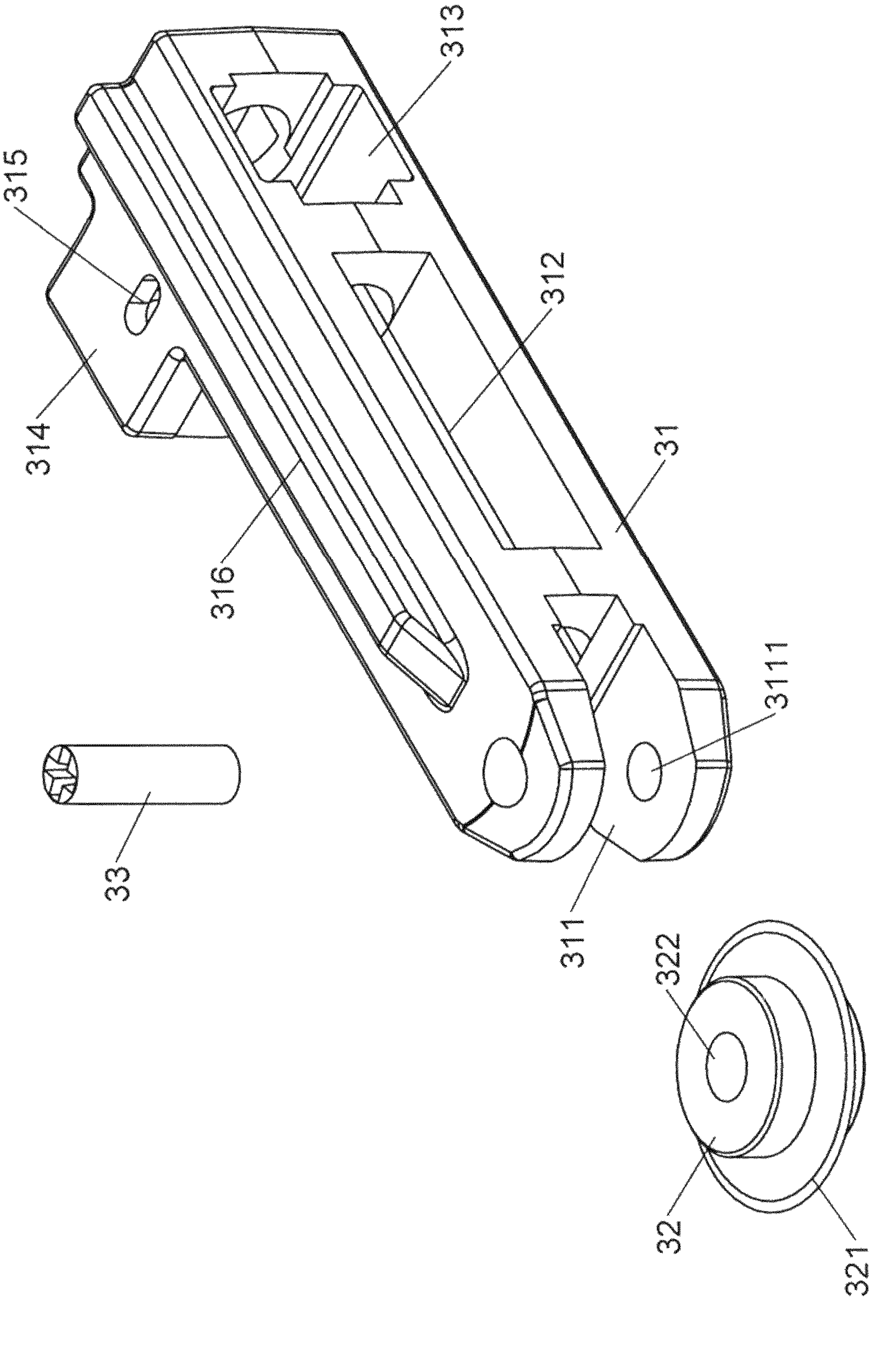
FIG. 4 is an exploded perspective view of a sliding unit of the pipe cutting device in accordance with the preferred embodiment of the present invention.
Figure 5:
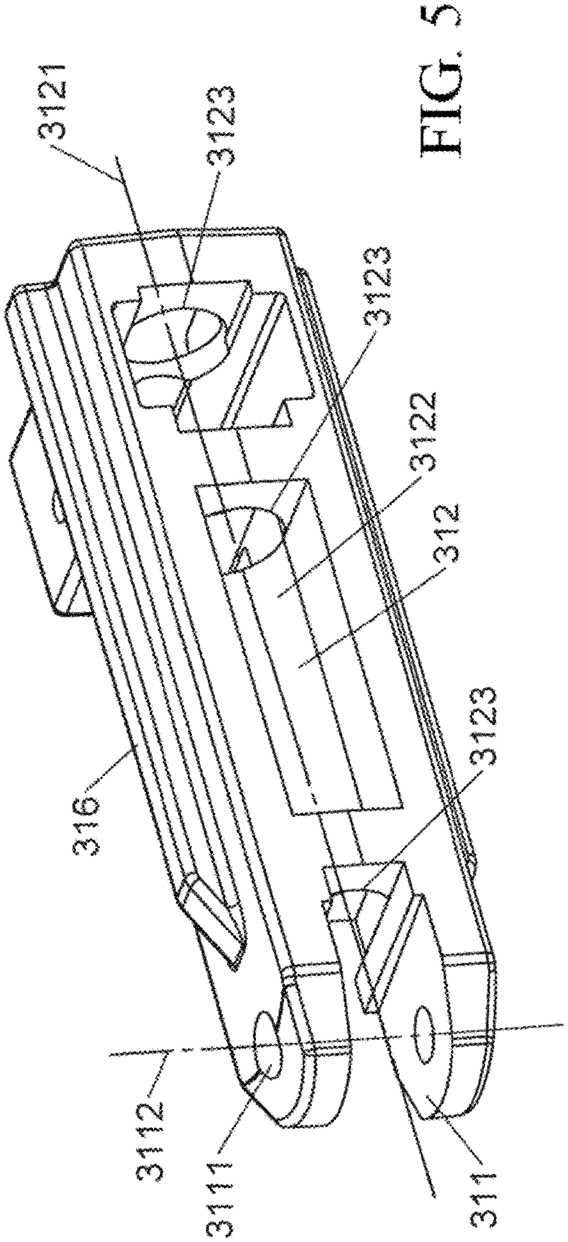
FIG. 5 is a perspective view of a slide of the pipe cutting device in accordance with the preferred embodiment of the present invention.
Figure 6:
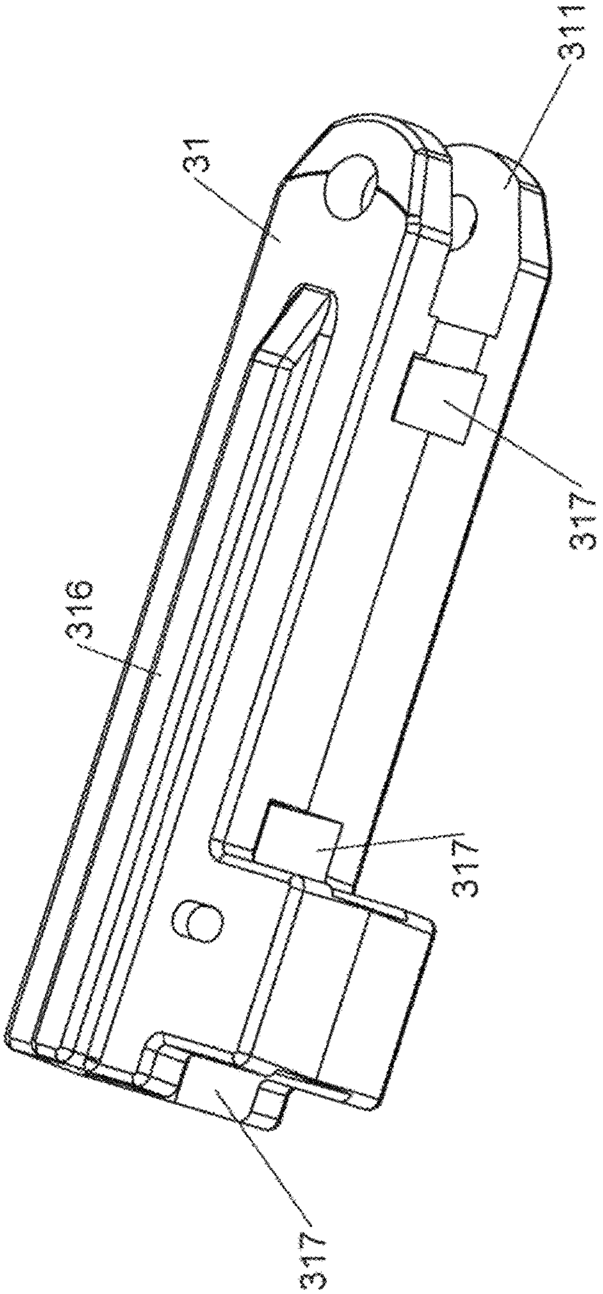
FIG. 6 is another perspective view of the slide of the pipe cutting device in accordance with the preferred embodiment of the present invention.
Figure 7:
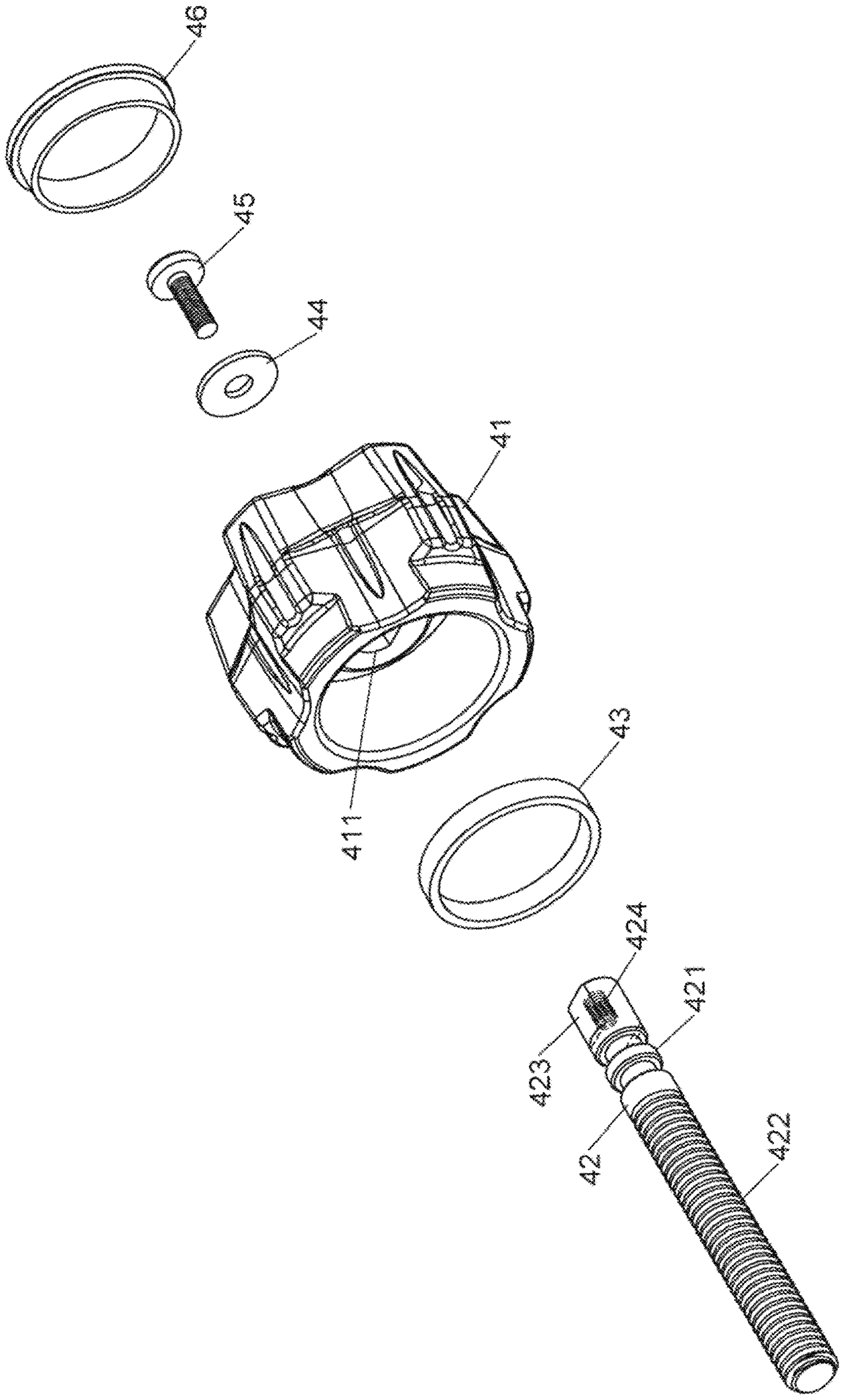
FIG. 7 is an exploded perspective view of a threaded rod unit of the pipe cutting device in accordance with the preferred embodiment of the present invention.
Figure 8:
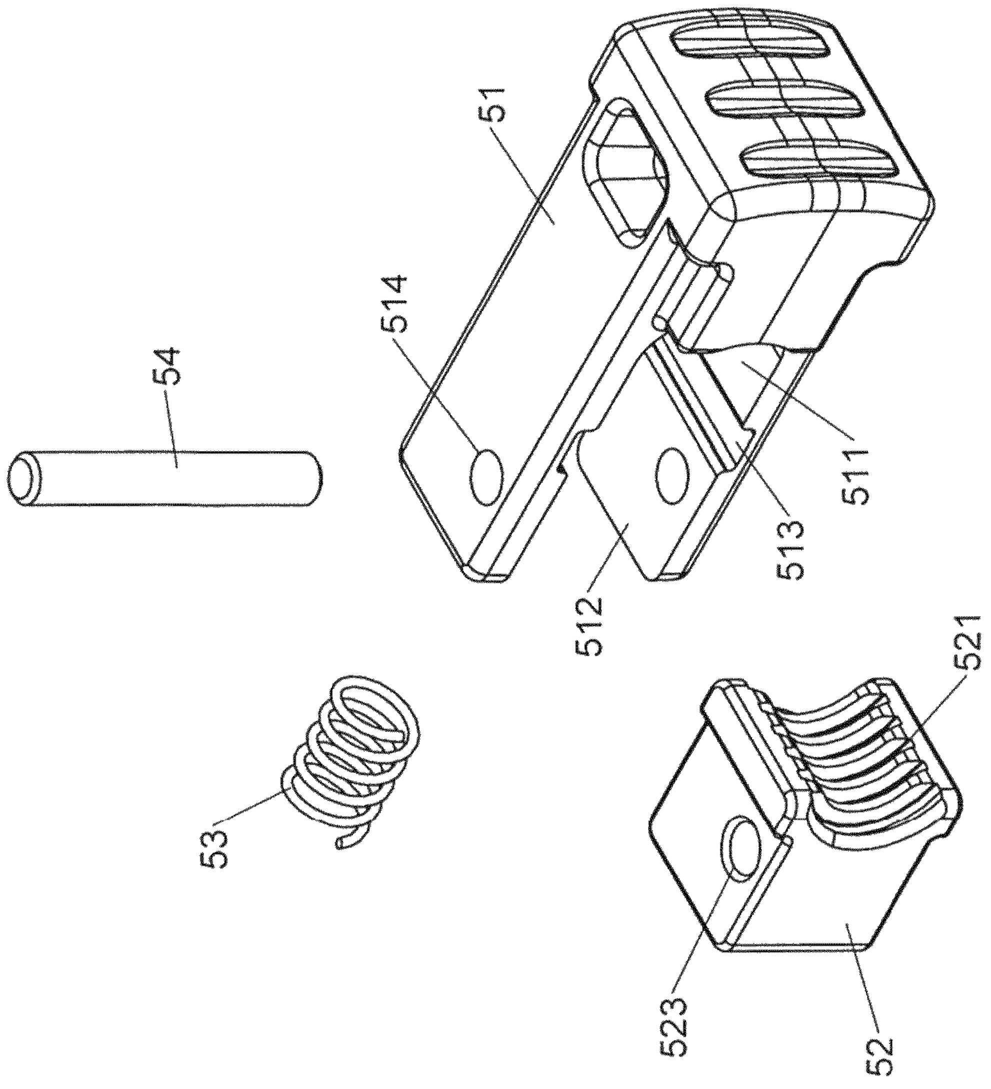
FIG. 8 is an exploded perspective view of a control unit of the pipe cutting device in accordance with the preferred embodiment of the present invention.
Figure 9:
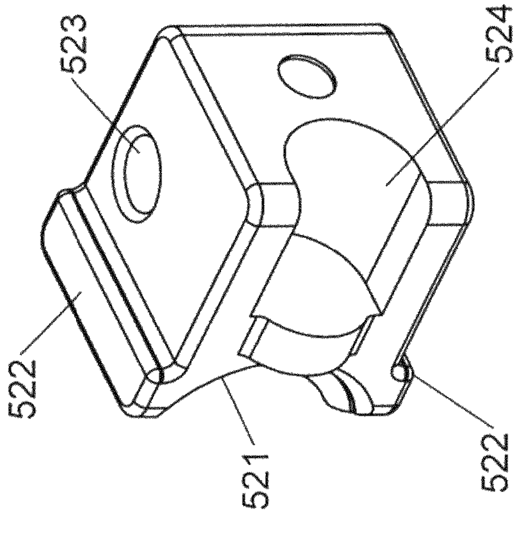
FIG. 9 is a perspective view of a control member of the pipe cutting device in accordance with the preferred embodiment of the present invention.
Figure 10:
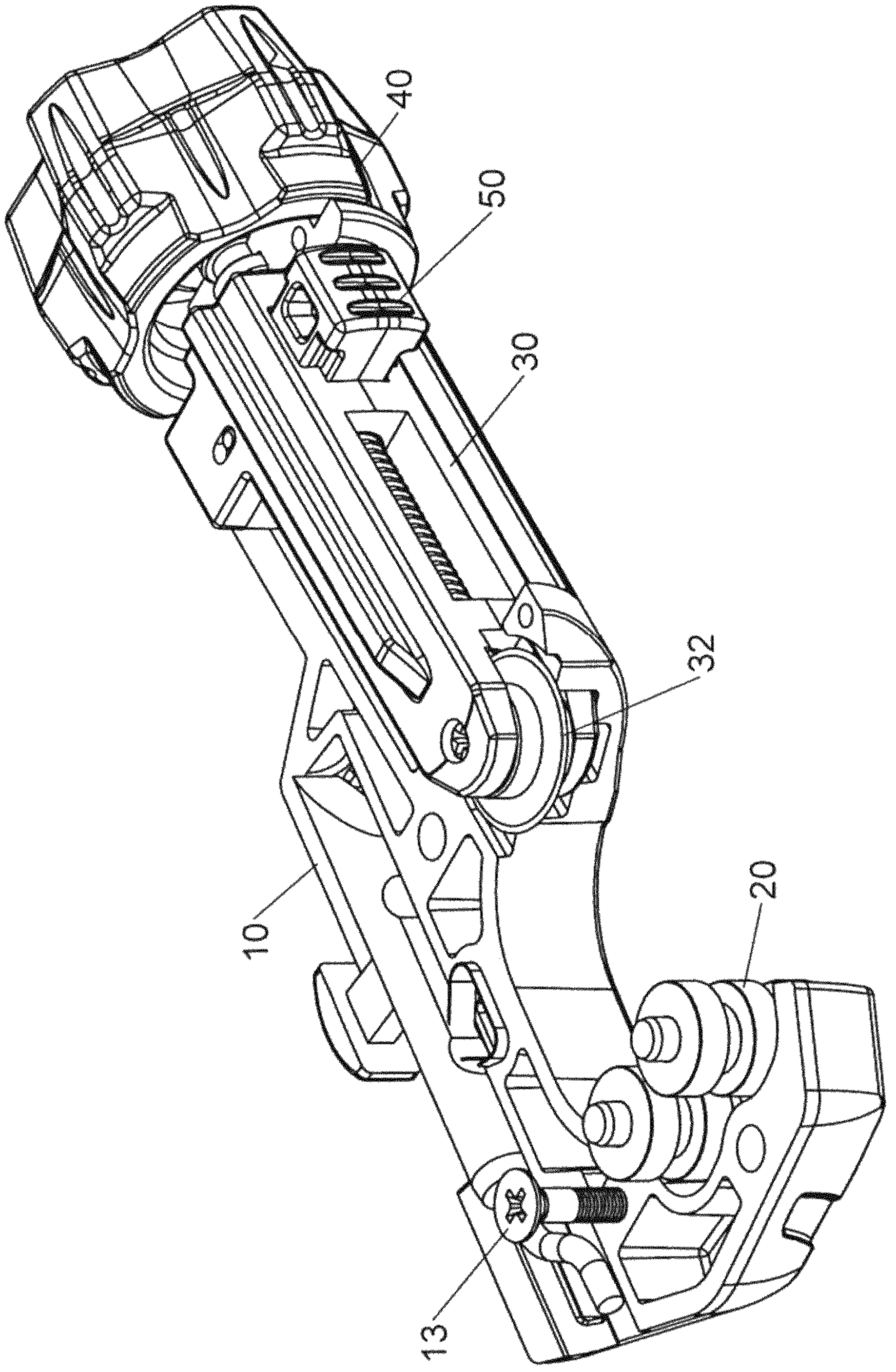
FIG. 10 is a partial perspective view of the pipe cutting device in accordance with the preferred embodiment of the present invention.

Referring to the drawings and initially to FIGS. 1-11, a pipe cutting device in accordance with the preferred embodiment of the present invention comprises a body unit 10, two roller units 20, a sliding unit 30, a threaded rod unit 40, and a control unit 50.

The body unit 10 includes two bodies (or housings or shells) 11, a trimming knife 12, and a first connecting (or fastening or coupling) member 13.

The two bodies 11 are opposite to each other and are arranged symmetrically. The two bodies 11 are assembled together. Each of the two bodies 11 has a first end provided with a first receiving recess 111 having a first face 1111, a second face 1112, and a third face 1113. The first face 1111 and the second face 1112 are spaced from each other and are parallel with each other. The third face 1113 is disposed between the first face 1111 and the second face 1112 and is perpendicular to the first face 1111 and the second face 1112. Each of the two bodies 11 is provided with a first slide guide 112 connected to the first receiving recess 111. The first slide guide 112 is an elongate channel and extends in a longitudinal direction of the first receiving recess 111.

The first end of each of the two bodies 11 is provided with a first pivoting section 113 located beside the first receiving recess 111. The first pivoting section 113 is a semi-circular groove. The first pivoting sections 113 of the two bodies 11 are juxtaposed and form a circular groove. The first pivoting section 113 has two abutting edges 1131 formed on two sides thereof. The two abutting edges 1131 are coaxial with and connected to the first pivoting section 113. Each of the two abutting edges 1131 is a semi-circular groove. The two abutting edges 1131 of the two bodies 11 are juxtaposed and form a circular groove. Each of the two abutting edges 1131 has a diameter less than that of the first pivoting section 113. The first pivoting section 113 and the two abutting edges 1131 are connected to the first receiving recess 111.

Each of the two bodies 11 has a second end provided with a second receiving recess 114 aligning with and spaced from the first receiving recess 111. Each of the two bodies 11 is provided with a first connecting (or fastening or coupling) portion 115. The first connecting portion 115 of one of the two bodies 11 is a through hole, and the first connecting portion 115 of the other one of the two bodies 11 is a screw hole. Each of the two bodies 11 is provided with multiple second connecting (or fastening or coupling) portions 116. Each of the second connecting portions 116 of one of the two bodies 11 is a circular groove, and each of the second connecting portions 116 of the other one of the two bodies 11 is a circular pillar. The second connecting portions 116 of the two bodies 11 are assembled respectively. Each of the two bodies 11 is provided with a third receiving recess 117 which is an elongate opening.

The trimming knife 12 is mounted in the third receiving recess 117 and is movable in the third receiving recess 117. The first connecting member 13 is a screw with an external thread. The first connecting member 13 extends through the first connecting portion 115 of one of the two bodies 11 and is screwed into the first connecting portion 115 of the other one of the two bodies 11, so that the two bodies 11 are assembled and combined together.

The two roller units 20 are pivotally mounted in the second receiving recess 114. Each of the two roller units 20 includes a shaft 21, three rollers 22, and two spacers 23. The shaft 21 is pivotally mounted in the second receiving recess 114. The shaft 21 is a rod. The three rollers 22 and the two spacers 23 are arranged alternatingly and are pivotally mounted on the shaft 21. The three rollers 22 are disposed at an outermost position.

The sliding unit 30 is mounted in the first receiving recess 111 and is movable in the first receiving recess 111. The sliding unit 30 is movable between the first face 1111 and the second face 1112. The sliding unit 30 is close to the first face 1111 or the second face 1112. The sliding unit 30 includes a slide 31, a cutting wheel 32, and a mandrel 33.

The slide 31 is received in the first receiving recess 111 and is movable linearly in the first receiving recess 111. The slide 31 has a first end provided with a fourth receiving recess 311 directed toward the second receiving recess 114. The fourth receiving recess 311 is provided with a first pivot portion 3111. The first pivot portion 3111 is a circular perforation. The first pivot portion 3111 is connected to the fourth receiving recess 311. The first pivot portion 3111 is provided with a first axis 3112. The slide 31 is provided with a fifth receiving recess 312 penetrating the slide 31 longitudinally. The fifth receiving recess 312 is provided with a second axis 3121. The second axis 3121 and the first axis 3112 are perpendicular to each other and intersect at a point. The fifth receiving recess 312 is provided with a first arcuate face 3122 and multiple second arcuate faces 3123. The second arcuate faces 3123 are arranged linearly. The first arcuate face 3122 are disposed between the second arcuate faces 3123.

The slide 31 has a second end provided with a sixth receiving recess 313. The fifth receiving recess 312 is disposed between the sixth receiving recess 313 and the fourth receiving recess 311. The sixth receiving recess 313 has a non-circular or tetragonal shape. The slide 31 is provided with a protruding block 314 extending a bottom depth of the sixth receiving recess 313. The protruding block 314 is moved linearly along the third face 1113. The protruding block 314 is provided with an elongate slot 315 connected to the sixth receiving recess 313. The slide 31 is provided with two second slide guides 316 formed on a top and a bottom thereof. Each of the two second slide guides 316 is slidably mounted on the first slide guide 112 of one of the two bodies 11. The two second slide guides 316 and the slide 31 extend in the same direction so that the sliding unit 30 slides on the body unit 10 linearly. Each of the two second slide guides 316 is an elongate projection. The slide 31 is provided with three hollows 317 spaced from each other. The three hollows 317 align with the second arcuate faces 3123.

The cutting wheel 32 is rotatably mounted in the fourth receiving recess 311. The cutting wheel 32 is a circular cutter and has a periphery provided with a knife (or blade) portion 321 for cutting a pipe. The cutting wheel 32 is provided with a second pivot portion 322 aligning with the first pivot portion 3111. The mandrel 33 extends through the first pivot portion 3111 and the second pivot portion 322 so that the cutting wheel 32 is rotatably mounted in the fourth receiving recess 311. The mandrel 33 is an elongate rod or a threaded rod.

The threaded rod unit 40 is pivotally connected with the body unit 10 and the sliding unit 30. The threaded rod unit 40 includes a rotation member 41, a threaded rod 42, a mounting member 43, a washer 44, a second connecting (or fastening or coupling) member 45, and a cover 46.

The rotation member 41 is rotatably mounted outside of the body unit 10 and can be rotated by a user. The rotation member 41 is provided with a first mounting portion 411. The first mounting portion 411 is a non-circular recess.

The threaded rod 42 is provided with a second pivoting section 421 pivotally mounted on the first pivoting section 113. The second pivoting section 421 has two sides abutting the two abutting edges 1131 so that the threaded rod 42 is not detached from the two bodies 11. The threaded rod 42 has a first end provided with a first screwing portion 422 pivotally mounted in the fifth receiving recess 312. The first screwing portion 422 has an axis coinciding with the second axis 3121. The first screwing portion 422 is not in contact with the first arcuate face 3122 and the second arcuate faces 3123 or the first screwing portion 422 is loosely fitted on the first arcuate face 3122 and the second arcuate faces 3123. The threaded rod 42 has a second end provided with a second mounting portion 423 mounted on the first mounting portion 411. The second mounting portion 423 has a shape matching that of the first mounting portion 411. When the rotation member 41 is rotated, the rotation member 41 drives and rotates the threaded rod 42. The second mounting portion 423 has an interior provided with a third connecting (or fastening or coupling) portion 424 which is a screw hole.

The mounting member 43 is mounted between the rotation member 41 and the body unit 10, to reduce a mutual friction between the rotation member 41 and the body unit 10. The mounting member 43 is made of soft material and has a friction loss. The washer 44 is received in the rotation member 41. The second connecting member 45 is a rod with an external thread. The second connecting member 45 extends through the washer 44 and is screwed into the third connecting portion 424. The cover 46 is secured on an opening of a distal end of the rotation member 41, to close the opening.

In assembly, the second pivoting section 421 is limited by the two abutting edges 1131, the threaded rod 42 is pivotally mounted in the body unit 10 and the sliding unit 30, and the rotation member 41 is limited by the threaded rod 42 and rotatably mounted outside of the body unit 10, so that the threaded rod unit 40 is pivotally mounted and rotated on the body unit 10 and the sliding unit 30.

The control unit 50 is assembled with the sliding unit 30 and the threaded rod unit 40. The control unit 50 is received and movable in the sixth receiving recess 313. The control unit 50 partially protrudes from the sixth receiving recess 313 and is pressed by the user. The control unit 50 drives the sliding unit 30 to move linearly in the first receiving recess 111.

The sliding unit 30 is moved in the body unit 10, and the control unit 50 is moved on the sliding unit 30. The control unit 50 is moved in a direction perpendicular to that of the sliding unit 30.

The control unit 50 includes a press member 51, a control member 52, an elastic member 53, and a third connecting (or fastening or coupling) member 54.

The press member 51 is received in and partially protrudes from the sixth receiving recess 313. The press member 51 is provided with a seventh receiving recess 511 receiving the threaded rod 42. The press member 51 has an end provided with a eighth receiving recess 512 which is an open cavity. The press member 51 is provided with two third slide guides 513 located between the seventh receiving recess 511 and the eighth receiving recess 512. The two third slide guides 513 are opposite to each other. Each of the two third slide guides 513 is a groove. The press member 51 is provided with a fourth connecting (or fastening or coupling) portion 514 which is a perforation. The fourth connecting portion 514 penetrates the eighth receiving recess 512 from top to bottom. The press member 51 is a non-circular piece.

The control member 52 is assembled with the press member 51 and received in the eighth receiving recess 512. The control member 52 has a first end provided with a second screwing portion 521 engaging (or meshing with) the first screwing portion 422. The control member 52 is provided with two fourth slide guides 522 formed on a top and a bottom thereof. The two fourth slide guides 522 are received in the two third slide guides 513. Each of the two fourth slide guides 522 is a protruding rail. The control member 52 is provided with a fifth connecting (or fastening or coupling) portion 523 aligning with the fourth connecting portion 514. The fifth connecting portion 523 is a perforation. The control member 52 has a second end provided with a spring cavity 524 which is disconnected from the second screwing portion 521. The control member 52 is a non-circular block.

The elastic member 53 is received in the spring cavity 524 and has a first end pressing the spring cavity 524 and a second end pressing a bottom of the sixth receiving recess 313. The second screwing portion 521 is pressed by an elastic force of the elastic member 53 and engages the first screwing portion 422. The elastic member 53 is a spring.

The third connecting member 54 extends through the fourth connecting portion 514 and the fifth connecting portion 523 and has an end extending into the elongate slot 315. The third connecting member 54 is movable in the elongate slot 315 so that the control unit 50 is movable on the sliding unit 30 through a distance.

In assembly, the threaded rod unit 40 restricts the control member 52 which restricts the press member 51, so that the control unit 50 is assembled on and not detached from the sliding unit 30. The third connecting member 54 is assembled with the press member 51 and the control member 52 and limited by the elongate slot 315, so that the control unit 50 is assembled on and not detached from the sliding unit 30. Thus, the control unit 50 is limited by the threaded rod unit 40 and the sliding unit 30 so that the control unit 50 has a double restriction function.

In practice, when the control unit 50 is pushed, the press member 51 and the control member 52 are moved in the sixth receiving recess 313, the elastic member 53 is compressed, and the second screwing portion 521 disengages the first screwing portion 422. Thus, when the control unit 50 is moved, the control unit 50 drives and moves the sliding unit 30, to adjust a distance between the cutting wheel 32 and the two roller units 20. When the control unit 50 is released, the control member 52 is moved by the elastic force of the elastic member 53, and the second screwing portion 521 engages the first screwing portion 422.

Figure 11:
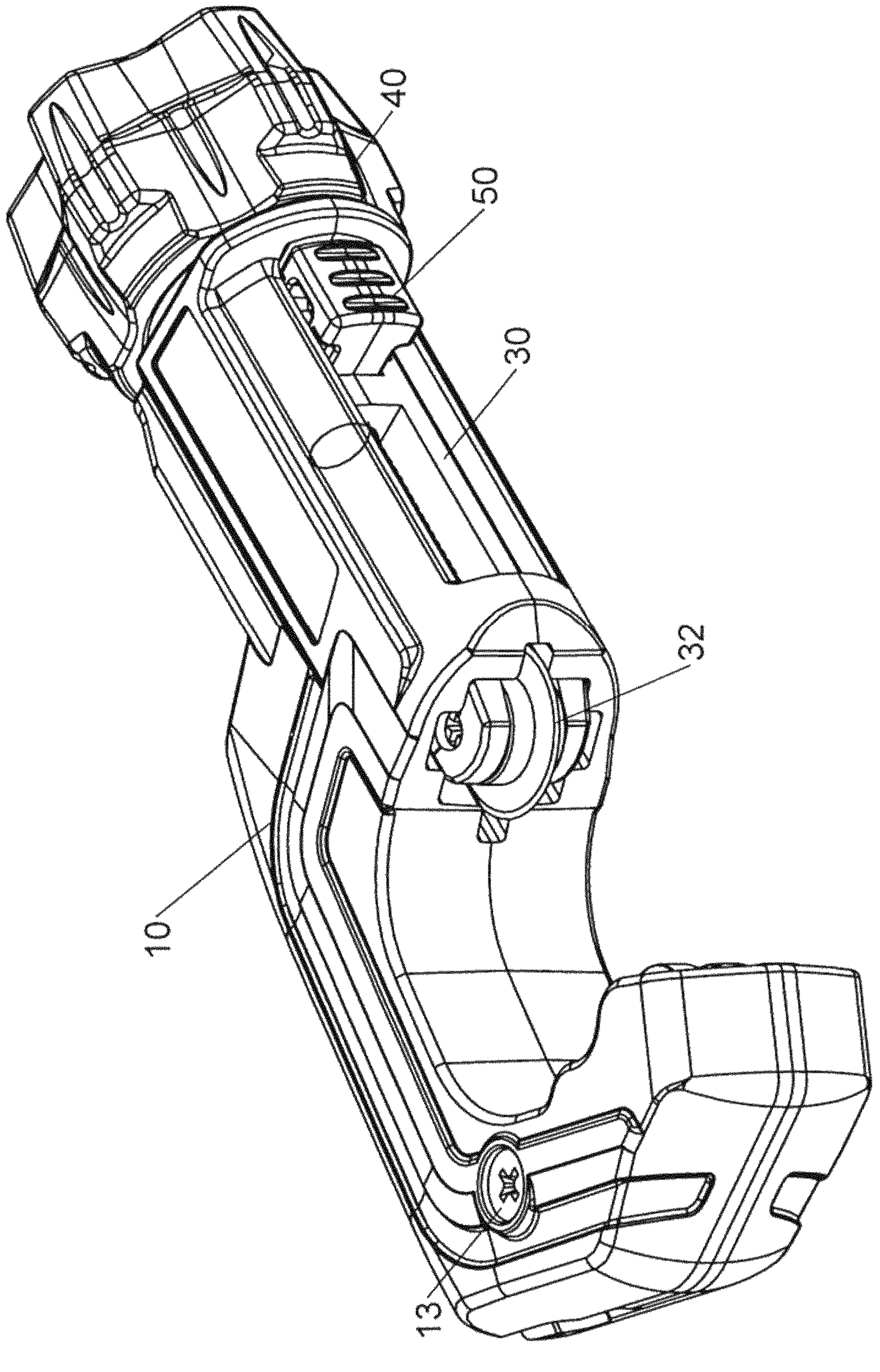
FIG. 11 is a perspective view of the pipe cutting device in accordance with the preferred embodiment of the present invention.
Figure 12:
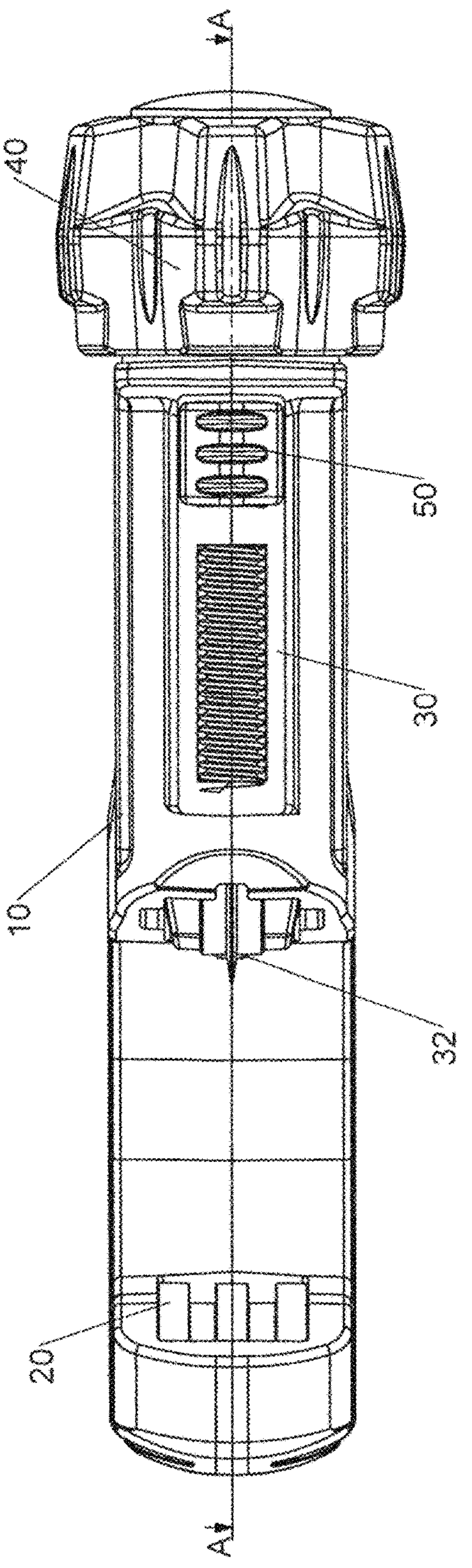
FIG. 12 is a side view of the pipe cutting device as shown in FIG. 11.
Figure 13:
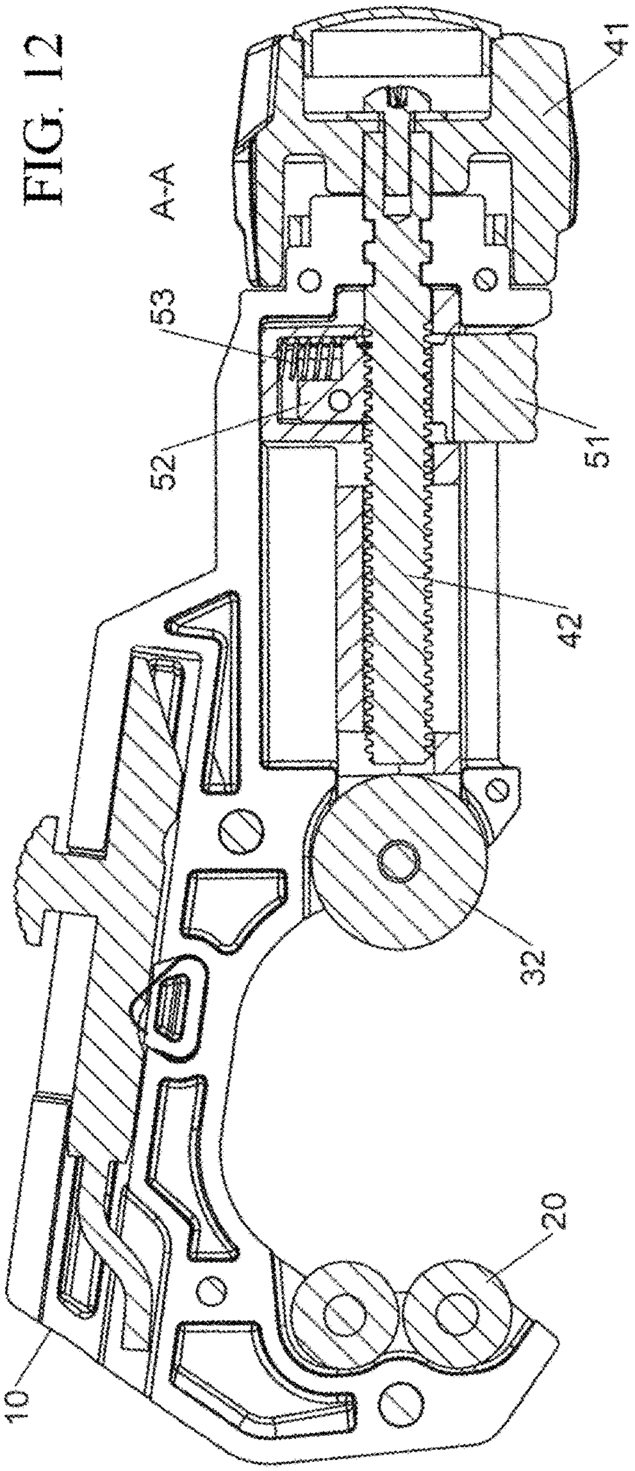
FIG. 13 is a cross-sectional view of the pipe cutting device taken along line A-A as shown in FIG. 12.

Referring to FIGS. 11-13 with reference to FIGS. 1-10, the two roller units 20 are mounted in the second receiving recess 114. The sliding unit 30 is mounted in the first receiving recess 111 and is movable linearly in the first receiving recess 111. The threaded rod 42 is pivotally mounted in the first pivoting section 113 and the fifth receiving recess 312. The second pivoting section 421 is pivotally mounted on the first pivoting section 113. Thus, the threaded rod unit 40 is pivotally connected with and rotatable on the body unit 10 and the sliding unit 30. The control unit 50 is received and movable in the sixth receiving recess 313.

Figure 14:
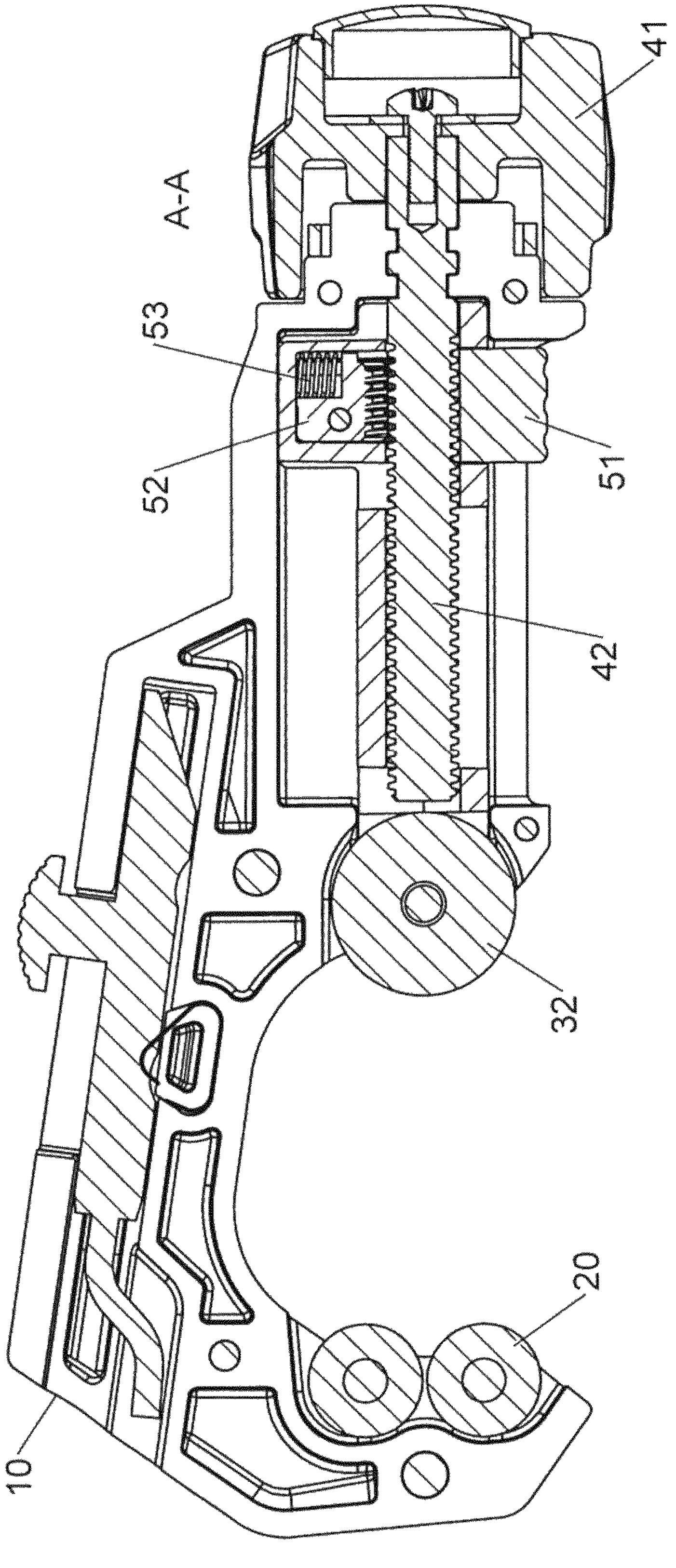
FIG. 14 is a first operational view of the pipe cutting device taken along line A-A as shown in FIG. 12.

Referring to FIG. 14 with reference to FIGS. 1-13, when the rotation member 41 is rotated, the second pivoting section 421 is limited by the two abutting edges 1131, so that the threaded rod 42 is rotated in place and cannot be displaced. At this time, the second screwing portion 521 is pressed by the elastic force of the elastic member 53 to engage the first screwing portion 422. In such a manner, when the threaded rod 42 is rotated, the control unit 50 is moved linearly relative to the threaded rod 42 by rotation of the first screwing portion 422, so that the sliding unit 30 is driven by the control unit 50 to move linearly in the first receiving recess 111, to adjust the distance between the cutting wheel 32 and the two roller units 20 according to the user's requirement.

Figure 15:
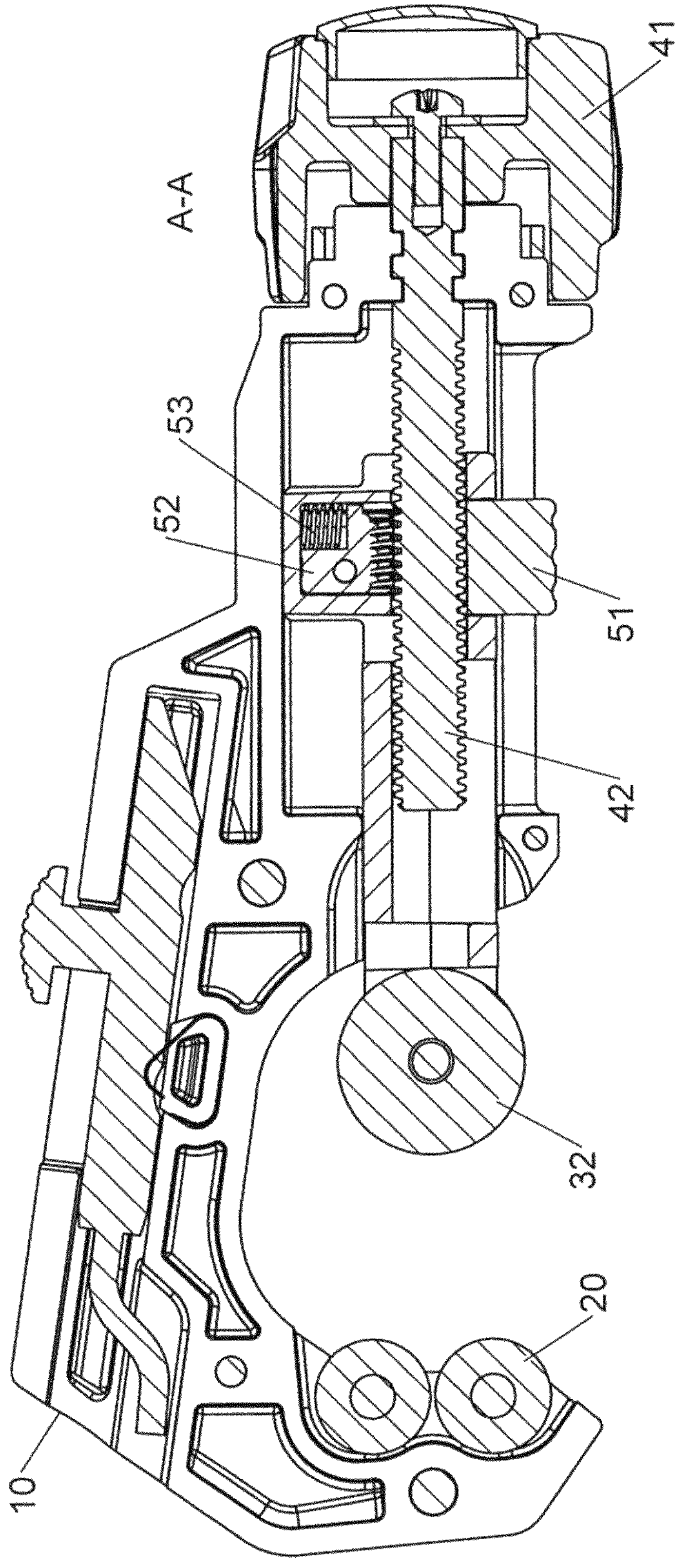
FIG. 15 is a second operational view of the pipe cutting device taken along line A-A as shown in FIG. 12.
Figure 16:
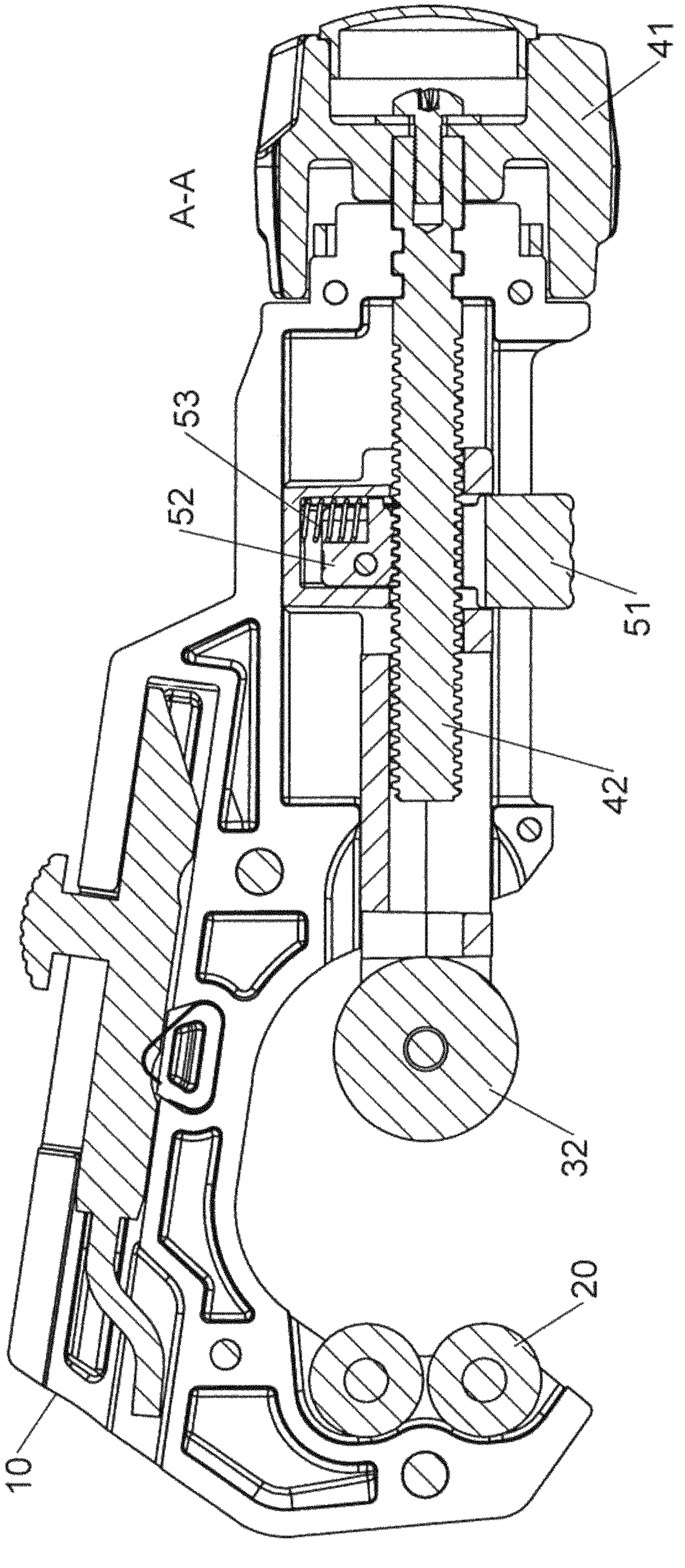
FIG. 16 is a third operational view of the pipe cutting device taken along line A-A as shown in FIG. 12.

Referring to FIGS. 15 and 16 with reference to FIGS. 1-10, when the control unit 50 is pushed by the user, the press member 51 and the control member 52 are moved in the sixth receiving recess 313, the elastic member 53 is compressed, and the second screwing portion 521 disengages the first screwing portion 422. Then, the control unit 50 is pushed by the user successively. Thus, when the control unit 50 is moved by the user, the control unit 50 drives and moves the sliding unit 30, to adjust the distance between the cutting wheel 32 and the two roller units 20 according to the user's requirement. When the control unit 50 is released, the control member 52 is moved by the elastic force of the elastic member 53, and the second screwing portion 521 engages the first screwing portion 422 again, so that the control unit 50 is positioned in place.

In another preferred embodiment of the present invention, a soft cushion (or pad or buffer) is mounted on the first face 1111 or mounted on the slide 31 and opposite to the first face 1111 to absorb a hitting force during displacement of the slide 31.

Accordingly, the pipe cutting device of the present invention has the following advantages.

1. The sliding unit 30 is moved in the first receiving recess 111, the threaded rod unit 40 is pivotally connected with the body unit 10 and the sliding unit 30, and the control unit 50 is received in the sliding unit 30, so that the body unit 10, the sliding unit 30, the threaded rod unit 40, and the control unit 50 are assembled exactly.
2. The control unit 50 is moved linearly so that the second screwing portion 521 engages or disengages the first screwing portion 422. The position of the sixth receiving recess 313 may have a larger tolerance. After the control unit 50 is received in the sixth receiving recess 313, the user only needs to rotate the threaded rod unit 40 slightly to engage the second screwing portion 521 with the first screwing portion 422. Thus, the second screwing portion 521 engages the first screwing portion 422 exactly by a linear displacement of the control unit 50.
3. The control unit 50 is moved linearly so that the second screwing portion 521 engages or disengages the first screwing portion 422. When the pipe cutting device has a larger specification, the width of the sixth receiving recess 313 is increased, so that the control member 52 may have a larger width, and the second screwing portion 521 has more teeth for engaging the first screwing portion 422. Thus, the second screwing portion 521 engages the first screwing portion 422 exactly by changing the width of the sixth receiving recess 313 and the width of the control member 52.
4. The second axis 3121 and the first axis 3112 are perpendicular to each other and intersect at a point. The first screwing portion 422 of the threaded rod unit 40 has an axis coincides with the second axis 3121. Thus, the axis of the threaded rod unit 40 is perpendicular to the cutting wheel 32 and the first axis 3112, so that the threaded rod unit 40 and the sliding unit 30 are assembled steadily.
5. After the cutting wheel 32 is subjected to a force, the force is directly transmitted to and supported by the sliding unit 30. At this time, the sliding unit 30 with a larger area is assembled with the body unit 10 and the threaded rod unit 40, to support a larger force or torque.
6. The body unit 10 is assembled with the sliding unit 30, the sliding unit 30 is assembled with the threaded rod unit 40, and the threaded rod unit 40 is assembled with the body unit 10, so that the body unit 10, the sliding unit 30, and the threaded rod unit 40 are interconnected, to enhance the structural stability of the pipe cutting device, and to facilitate assembly of the pipe cutting device.
7. The threaded rod unit 40 restricts the control member 52 which restricts the press member 51, so that the control unit 50 is assembled on and not detached from the sliding unit 30. The third connecting member 54 is assembled with the press member 51 and the control member 52 and limited by the elongate slot 315, so that the control unit 50 is assembled on and not detached from the sliding unit 30. In such a manner, the threaded rod unit 40 restricts the control unit 50, and the control unit 50 and is limited by the elongate slot 315. Thus, the control unit 50 is limited by the threaded rod unit 40 and the sliding unit 30 so that the control unit 50 has a double restriction function without detachment. Therefore, the sliding unit 30, the threaded rod unit 40, and the control unit 50 are interconnected and assembled exactly.
8. The threaded rod unit 40 is rotated to drive the control unit 50 which drives and moves the sliding unit 30, to adjust the distance between the cutting wheel 32 and the two roller units 20. Alternatively, when the control unit 50 is pushed, the second screwing portion 521 disengages the first screwing portion 422. Then, the control unit 50 is pushed by the user successively. When the control unit 50 is moved by the user, the control unit 50 drives and moves the sliding unit 30, to adjust the distance between the cutting wheel 32 and the two roller units 20. Thus, the pipe cutting device has two different control mechanisms to adjust the distance between the cutting wheel 32 and the two roller units 20 according to the user's requirement.
9. The first arcuate face 3122 and the second arcuate faces 3123 of the fifth receiving recess 312 are used for pivoting the first screwing portion 422, to restrict and prevent a deflection of the threaded rod 42. The threaded rod 42 has a determined length. The second pivoting section 421 of the threaded rod 42 is pivotally mounted on the first pivoting section 113. Then, the first screwing portion 422 is pivotally mounted on the first arcuate face 3122 and the second arcuate faces 3123. Thus, the threaded rod 42 has a better pivoting structure.
10. The sliding unit 30, the threaded rod unit 40, and the control unit 50 are assembled easily and conveniently. Thus, the sliding unit 30, the threaded rod unit 40, and the control unit 50 are assembled previously and then placed into the body unit 10.

11. The sliding unit 30 is limited by the threaded rod unit 40 and will not be detached from the first receiving recess 111. Each of the two second slide guides 316 is mounted on the first slide guide 112 of one of the two bodies 11, to prevent the sliding unit 30 from being detached from the first receiving recess 111.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A pipe cutting device comprising:

a body unit, two roller units, a sliding unit, a threaded rod unit, and a control unit;

wherein:

the body unit includes two bodies;

the two bodies are assembled together;

each of the two bodies has a first end provided with a first receiving recess having a first face, a second face, and a third face;

the first face and the second face are spaced from each other and are parallel with each other;

the third face is disposed between the first face and the second face and is perpendicular to the first face and the second face;

each of the two bodies is provided with a first slide guide connected to the first receiving recess;

the first slide guide is an elongate channel and extends in a longitudinal direction of the first receiving recess;

the first end of each of the two bodies is provided with a first pivoting section located beside the first receiving recess;

the first pivoting section has two abutting edges formed on two sides thereof;

the two abutting edges are coaxial with and connected to the first pivoting section;

the first pivoting section and the two abutting edges are connected to the first receiving recess;

each of the two bodies has a second end provided with a second receiving recess aligning with and spaced from the first receiving recess;

the two roller units are pivotally mounted in the second receiving recess;

the sliding unit is mounted in the first receiving recess and is movable in the first receiving recess;

the sliding unit is movable between the first face and the second face;

the sliding unit is close to the first face or the second face;

the sliding unit includes a slide, a cutting wheel, and a mandrel;

the slide is received in the first receiving recess and is movable linearly in the first receiving recess;

the slide has a first end provided with a fourth receiving recess directed toward the second receiving recess;

the fourth receiving recess is provided with a first pivot portion;

the first pivot portion is connected to the fourth receiving recess;

the first pivot portion is provided with a first axis;

the slide is provided with a fifth receiving recess penetrating the slide longitudinally;

the fifth receiving recess is provided with a second axis;

the second axis and the first axis are perpendicular to each other and intersect at a point;

the fifth receiving recess is provided with a first arcuate face and multiple second arcuate faces;

the second arcuate faces are arranged linearly;

the first arcuate face are disposed between the second arcuate faces;

the slide has a second end provided with a sixth receiving recess;

the fifth receiving recess is disposed between the sixth receiving recess and the fourth receiving recess;

the sixth receiving recess has a non-circular or tetragonal shape;

the slide is provided with a protruding block extending a bottom depth of the sixth receiving recess;

the protruding block is moved linearly along the third face;

the protruding block is provided with an elongate slot connected to the sixth receiving recess;

the slide is provided with two second slide guides formed on a top and a bottom thereof;

each of the two second slide guides is slidably mounted on the first slide guide of one of the two bodies;

the two second slide guides and the slide extend in the same direction so that the sliding unit slides on the body unit linearly;

each of the two second slide guides is an elongate projection;

the cutting wheel is rotatably mounted in the fourth receiving recess;

the cutting wheel is a circular cutter and has a periphery provided with a knife portion for cutting a pipe;

the cutting wheel is provided with a second pivot portion aligning with the first pivot portion;

the mandrel extends through the first pivot portion and the second pivot portion so that the cutting wheel is rotatably mounted in the fourth receiving recess;

the threaded rod unit is pivotally connected with the body unit and the sliding unit;

the threaded rod unit includes a rotation member and a threaded rod;

the rotation member is rotatably mounted outside of the body unit and can be rotated;

the rotation member is provided with a first mounting portion;

the threaded rod is provided with a second pivoting section pivotally mounted on the first pivoting section;

the second pivoting section has two sides abutting the two abutting edges so that the threaded rod is not detached from the two bodies;

the threaded rod has a first end provided with a first screwing portion pivotally mounted in the fifth receiving recess;

the first screwing portion has an axis coinciding with the second axis;

the first screwing portion is not in contact with the first arcuate face and the second arcuate faces or the first screwing portion is loosely fitted on the first arcuate face and the second arcuate faces;

the threaded rod has a second end provided with a second mounting portion mounted on the first mounting portion;

the second mounting portion has a shape matching that of the first mounting portion;

when the rotation member is rotated, the rotation member drives and rotates the threaded rod;

the second pivoting section is limited by the two abutting edges, the threaded rod is pivotally mounted in the body unit and the sliding unit, and the rotation member is limited by the threaded rod and rotatably mounted outside of the body unit, so that the threaded rod unit is pivotally mounted and rotated on the body unit and the sliding unit;

the control unit is assembled with the sliding unit and the threaded rod unit;

the control unit is received and movable in the sixth receiving recess;

the control unit partially protrudes from the sixth receiving recess and is pressed;

the control unit drives the sliding unit to move linearly in the first receiving recess;

the sliding unit is moved in the body unit, and the control unit is moved on the sliding unit;

the control unit is moved in a direction perpendicular to that of the sliding unit;

the control unit includes a press member, a control member, an elastic member, and a third connecting member;

the press member is received in and partially protrudes from the sixth receiving recess;

the press member is provided with a seventh receiving recess receiving the threaded rod;

the press member has an end provided with a eighth receiving recess which is an open cavity;

the press member is provided with two third slide guides located between the seventh receiving recess and the eighth receiving recess;

the two third slide guides are opposite to each other;

each of the two third slide guides is a groove;

the press member is provided with a fourth connecting portion which is a perforation;

the fourth connecting portion penetrates the eighth receiving recess from top to bottom;

the press member is a non-circular piece;

the control member is assembled with the press member and received in the eighth receiving recess;

the control member has a first end provided with a second screwing portion engaging the first screwing portion;

the control member is provided with two fourth slide guides formed on a top and a bottom thereof;

the two fourth slide guides are received in the two third slide guides;

each of the two fourth slide guides is a protruding rail;

the control member is provided with a fifth connecting portion aligning with the fourth connecting portion;

the fifth connecting portion is a perforation;

the control member has a second end provided with a spring cavity which is disconnected from the second screwing portion;

the control member is a non-circular block;

the elastic member is received in the spring cavity and has a first end pressing the spring cavity and a second end pressing a bottom of the sixth receiving recess;

the second screwing portion is pressed by an elastic force of the elastic member and engages the first screwing portion;

the elastic member is a spring;

the third connecting member extends through the fourth connecting portion and the fifth connecting portion and has an end extending into the elongate slot;

the third connecting member is movable in the elongate slot so that the control unit is movable on the sliding unit through a distance;

the threaded rod unit restricts the control member which restricts the press member, so that the control unit is assembled on and not detached from the sliding unit;

the third connecting member is assembled with the press member and the control member and limited by the elongate slot, so that the control unit is assembled on and not detached from the sliding unit;

the control unit is limited by the threaded rod unit and the sliding unit so that the control unit has a double restriction function;

when the control unit is pushed, the press member and the control member are moved in the sixth receiving recess, the elastic member is compressed, and the second screwing portion disengages the first screwing portion;

when the control unit is moved, the control unit drives and moves the sliding unit, to adjust a distance between the cutting wheel and the two roller units; and when the control unit is released, the control member is moved by the elastic force of the elastic member, and the second screwing portion engages the first screwing portion.

2. The pipe cutting device as claimed in claim 1, wherein the two bodies are opposite to each other and are arranged symmetrically.

3. The pipe cutting device as claimed in claim 2, wherein the first pivot portion is a circular perforation, the slide is provided with three hollows spaced from each other, and the three hollows align with the second arcuate faces.

4. The pipe cutting device as claimed in claim 3, wherein the first mounting portion is a non-circular recess, and the second mounting portion has an interior provided with a third connecting portion which is a screw hole.

5. The pipe cutting device as claimed in claim 4, wherein:

the threaded rod unit further includes a mounting member, a washer, a second connecting member, and a cover;

the mounting member is mounted between the rotation member and the body unit, to reduce a mutual friction between the rotation member and the body unit;

the mounting member is made of soft material and has a friction loss;

the washer is received in the rotation member;

the second connecting member is a rod with an external thread;

the second connecting member extends through the washer and is screwed into the third connecting portion; and the cover is secured on an opening of a distal end of the rotation member, to close the opening.

6. The pipe cutting device as claimed in claim 2, wherein a soft cushion is mounted on the first face or mounted on the slide and opposite to the first face to absorb a hitting force during displacement of the slide.

7. The pipe cutting device as claimed in claim 1, wherein:

the first pivoting section is a semi-circular groove;

the first pivoting sections of the two bodies are juxtaposed and form a circular groove;

each of the two abutting edges is a semi-circular groove;

the two abutting edges of the two bodies are juxtaposed and form a circular groove; and each of the two abutting edges has a diameter less than that of the first pivoting section.

8. The pipe cutting device as claimed in claim 1, wherein:

each of the two bodies is provided with a first connecting portion;

the first connecting portion of one of the two bodies is a through hole, and the first connecting portion of the other one of the two bodies is a screw hole;

each of the two bodies is provided with multiple second connecting portions;

each of the second connecting portions of one of the two bodies is a circular groove, and each of the second connecting portions of the other one of the two bodies is a circular pillar;

the second connecting portions of the two bodies are assembled respectively;

the body unit further includes a first connecting member;

the first connecting member is a screw with an external thread; and the first connecting member extends through the first connecting portion of one of the two bodies and is screwed into the first connecting portion of the other one of the two bodies, so that the two bodies are assembled and combined together.

9. The pipe cutting device as claimed in claim 1, wherein:

the body unit further includes a trimming knife;

each of the two bodies is provided with a third receiving recess which is an elongate opening; and the trimming knife is mounted in the third receiving recess and is movable in the third receiving recess.

10. The pipe cutting device as claimed in claim 1, wherein:

each of the two roller units includes a shaft, three rollers, and two spacers;

the shaft is pivotally mounted in the second receiving recess;

the shaft is a rod;

the three rollers and the two spacers are arranged alternatingly and are pivotally mounted on the shaft; and the three rollers are disposed at an outermost position.

11. The pipe cutting device as claimed in claim 1, wherein the mandrel is an elongate rod or a threaded rod.

* * * * *